(12) United States Patent
Yermakov et al.

(10) Patent No.: US 11,650,994 B2
(45) Date of Patent: *May 16, 2023

(54) MONITORING NETWORK TRAFFIC TO DETERMINE SIMILAR CONTENT

(71) Applicant: Level 3 Communications, LLC, Broomfield, CO (US)

(72) Inventors: Sergey Yermakov, Littleton, CO (US); Travis Ewert, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/222,101

(22) Filed: Apr. 5, 2021

(65) Prior Publication Data

US 2021/0224283 A1  Jul. 22, 2021

Related U.S. Application Data

(63) Continuation of application No. 16/595,029, filed on Oct. 7, 2019, now Pat. No. 10,977,252, which is a
(Continued)

(51) Int. Cl.
*G06F 16/2455* (2019.01)
*G06F 16/28* (2019.01)
(Continued)

(52) U.S. Cl.
CPC ...... *G06F 16/24568* (2019.01); *G06F 16/285* (2019.01); *H04L 43/022* (2013.01);
(Continued)

(58) Field of Classification Search
CPC ............. G06F 16/24568; G06F 16/285; H04L 43/022; H04L 43/0894; H04L 47/2483;
(Continued)

(56) References Cited

U.S. PATENT DOCUMENTS 5,640,430 A * 6/1997 Cudak ................ H04B 1/16
455/343.2
5,737,238 A * 4/1998 Mouradian ........ G01N 21/8983
702/191
(Continued)

OTHER PUBLICATIONS

International Search Report dated Jul. 19, 2017, In'tl Appl. No. PCT/US17/031763, Int'l Filing Date May 9, 2017; 3 pgs.
(Continued)

*Primary Examiner* — Ninos Donabed

(57) ABSTRACT

In an embodiment, a method monitors a plurality of data streams passing through a router in the connectivity service provider environment, and for each of the data streams, periodically samples packets at the router. The method further generates a stream signature based at least on the payload of the sampled packets. The method further includes, for each generated stream signature, attaching information to the stream signature. Such information may, for example, include time-stamp information for the stream signature, or an identification of the router. The method may further comprise storing the stream signatures corresponding to the data streams in a database. The stored stream signatures may be compared to determine matching stream signatures. Matching signatures may identify data streams that carry identical or similar content.

8 Claims, 5 Drawing Sheets

Related U.S. Application Data continuation of application No. 15/149,741, filed on May 9, 2016, now Pat. No. 10,437,829.

(51) Int. Cl.
| | |
|---|---|
| *H04L 43/022* | (2022.01) |
| *H04L 43/0894* | (2022.01) |
| *H04L 47/2483* | (2022.01) |
| *H04L 47/28* | (2022.01) |
| *H04L 47/31* | (2022.01) |
| *H04L 45/24* | (2022.01) |
| *H04L 45/7453* | (2022.01) |

(52) U.S. Cl.
CPC ...... *H04L 43/0894* (2013.01); *H04L 47/2483* (2013.01); *H04L 47/28* (2013.01); *H04L 47/31* (2013.01); *H04L 45/24* (2013.01); *H04L 45/7453* (2013.01)

(58) Field of Classification Search
CPC ......... H04L 47/28; H04L 47/31; H04L 45/24; H04L 45/7453
See application file for complete search history.

(56) References Cited

U.S. PATENT DOCUMENTS

| | | | |
|---|---|---|---|
| 6,271,889 B1* | 8/2001 | Bohm | H04N 5/10 348/521 |
| 6,654,373 B1 | 11/2003 | Maher, III | |
| 6,907,045 B1 | 6/2005 | Robinson | |
| 7,421,737 B1 | 9/2008 | Hernacki | |
| 7,646,832 B2* | 1/2010 | Hasan | H04L 27/2017 370/320 |
| 8,179,792 B1 | 5/2012 | Doerr et al. | |
| 8,594,429 B2* | 11/2013 | Delorme | G11B 27/105 382/209 |
| 8,670,198 B1* | 3/2014 | Liao | G11B 20/10046 360/32 |
| 8,909,733 B2 | 12/2014 | Adams | |
| 9,275,141 B2* | 3/2016 | Wang | G06F 16/683 |
| 10,091,074 B2 | 10/2018 | Lin | |
| 10,191,715 B2* | 1/2019 | Ando | H04R 27/00 |
| 2001/0038667 A1* | 11/2001 | Urabe | H04B 1/7093 375/E1.018 |
| 2004/0083299 A1 | 4/2004 | Dietz et al. | |
| 2004/0103205 A1 | 5/2004 | Larson | |
| 2004/0257994 A1 | 12/2004 | Paskett | |
| 2005/0258942 A1 | 11/2005 | Manasseh | |
| 2006/0291485 A1 | 12/2006 | Thubert | |
| 2007/0160073 A1 | 7/2007 | Toumura | |
| 2007/0226212 A1 | 9/2007 | Aggarwal et al. | |
| 2007/0226362 A1 | 9/2007 | Johnson | |
| 2008/0021874 A1 | 1/2008 | Dahl | |
| 2010/0268840 A1* | 10/2010 | Hiie | H04L 63/065 709/244 |
| 2011/0051614 A1 | 3/2011 | Li et al. | |
| 2011/0252046 A1 | 10/2011 | Szabo | |
| 2012/0185719 A1 | 7/2012 | Taylor | |
| 2012/0256726 A1 | 10/2012 | Honkanen | |
| 2012/0257508 A1 | 10/2012 | Reunamaki | |
| 2012/0307949 A1* | 12/2012 | Dvir | H04L 7/005 375/376 |
| 2012/0324520 A1 | 12/2012 | Van Deventer | |
| 2013/0100803 A1 | 4/2013 | Menchaca | |
| 2014/0019486 A1* | 1/2014 | Majumdar | G06F 16/24568 707/780 |
| 2014/0250999 A1* | 9/2014 | Lawson | E21B 49/02 73/152.23 |
| 2014/0280272 A1* | 9/2014 | Choque | G06F 16/137 707/758 |
| 2014/0351280 A1* | 11/2014 | Sagy | G06F 16/951 707/758 |
| 2015/0312125 A1 | 10/2015 | Subramanian | |
| 2015/0312311 A1 | 10/2015 | Subramanian | |
| 2016/0234570 A1 | 8/2016 | Van Deventer | |
| 2016/0335627 A1* | 11/2016 | Hugot | H04L 9/3247 |
| 2017/0076139 A1* | 3/2017 | Park | G06F 3/04886 |
| 2017/0078124 A1 | 3/2017 | Lopez | |
| 2017/0123676 A1* | 5/2017 | Singhai | G06F 3/0608 |
| 2017/0123677 A1* | 5/2017 | Singhai | G06F 16/00 |
| 2017/0123678 A1* | 5/2017 | Singhai | G06F 3/0652 |
| 2017/0123689 A1* | 5/2017 | Singhai | G06F 3/0608 |
| 2017/0187496 A1 | 6/2017 | Shalev | |
| 2017/0324634 A1 | 11/2017 | Yermakov et al. | |
| 2020/0042527 A1 | 2/2020 | Yermakov | |

OTHER PUBLICATIONS

Written Opinion of the International Searching Authority dated Jul. 19, 2017, Int'l Appl. No. PCT/US17/031753, Int'l Filing Date May 9, 2017; 9 pgs.

* cited by examiner

MONITORING NETWORK TRAFFIC TO DETERMINE SIMILAR CONTENT

BACKGROUND

Field

This field is generally related to traffic monitoring.

Related Art

Network services may, for example, provide connectivity from a customer network to another computer network, such as the Internet. A client connects to a server using a connectivity service provided by a connectivity service provider. Multiple routers in a connectivity service provider environment may concurrently carry traffic with identical or similar content to one or more clients leading to inefficient usage of network resources.

A data stream transmitted from a content service provider (e.g., media content service provider, voice-over-IP (VOIP) service provider, etc.) to a client (e.g., an end user) is typically identified by a series of data packets sharing a source and destination address, and protocol information. For example, packets in a data stream may have a common source IP address, source port address, destination IP address, destination port address, and protocol information. In a specific example, a data stream may correspond to a media streaming session for a client streaming a movie from a media content provider.

In a connectivity service provider environment, two or more clients may be simultaneously receiving the same content from a common content provider. For example, two end users may be streaming the same movie concurrently. Alternatively, one end user may be receiving a very heavy (requiring high bandwidth) data stream that is sent to the end user through two or more paths at the same time. To this end, two or more routers in the connectivity service provider environment may be relaying similar or identical content to two or more clients.

A connectivity service provider may be interested in knowing that two or more of its clients are concurrently receiving the same or identical data streams. This information may be used by the service provider for a variety of reasons. For example, the connectivity service provider may leverage this information to provide a better route for this data stream through its routers, improving the efficiency of using network resources. In other examples, the connectivity service provider may use this information to perform multicasting, or data compression.

Different streams may use different protocols. It is possible for the connectivity service provider to inspect the traffic going through its routers, and identify how much traffic per unit time is being relayed for each protocol. Different protocols may include media streaming, voice over IP (VoIP), etc. Additionally, to identify similar streams, a connectivity service provider may look into packets being relayed through its routers.

However, it is often not enough to just look at the information in the header of packets of two data streams to identify whether these two streams are carrying the same content. For example, if a data stream is being simultaneously sent to two different end users, the destination IP address (and possibly the destination port address) of the packets addressed to these two end users are different. Therefore, a mechanism is required to look into the payload of the packets of two data streams to determine that they carry the same content.

However, parsing the payload of packets being relayed through the routers of a connectivity service provider is typically very computation-intensive. Additionally, parsing packets intended for a client may violate the client's privacy. Therefore, a different method is desired for identifying similar streams by looking at the payload of the packets being related through the routers of a connectivity service provider.

BRIEF SUMMARY

In an embodiment, a method is disclosed for identifying similar data streams in a connectivity service provider environment. The method may comprise selecting a predetermined number of data streams with highest data rates among a plurality of data streams passing through a router in the connectivity service provider environment. The method may further comprise, for each of the selected data streams, receiving periodical sample packets from the router, and generating a stream signature based on the sample packets. The method may further comprise, for each generated stream signature, attaching time-stamp information to the stream signature, attaching an identification of the router to the stream signature, and storing the stream signatures corresponding to the selected streams in a database. The above two stream signatures stored in the database may be compared to determine whether the corresponding streams are similar.

In an embodiment, a method is disclosed for monitoring data streams through routers in a connectivity service provider environment that comprises retrieving, from a database, a plurality of stream signatures and a plurality of data streams relayed through a plurality of routers in the connectivity service provider environment. The method may further comprise classifying the plurality of stream signatures into a number of classes. Each class identifies a group of stream signatures that most resemble each other. The method may further comprise identifying a data stream simultaneously relayed through at least two routers in the connectivity service provider environment. The identification may be based on examining stream signatures in a class, and determining at least two stream signatures within the class that have substantially similar time-stamp information.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

A method and system according to an embodiment discloses how to determine that two different streams carry similar (or identical) content. In an embodiment, data streams are monitored at a router, and a stream signature is generated for each data stream. Each stream signature may be generated based on periodically sampled packets within a stream and may only correspond to a predetermined time interval. Once a stream signature is generated, time stamp information may be attached to the stream signature to identify to which time interval the stream signature corresponds. Additionally, router identification information may be attached to the stream signature to identify at which router the data stream was observed. Other types of information may additionally or alternatively be attached to a stream signature.

In an embodiment, stream signatures collected from routers within a connectivity service provider environment are clustered into multiple clusters, where each cluster includes signatures most similar to each other. Each individual cluster may then be examined, and matching signatures within the cluster may be identified. Two matching signatures indicate identical or similar content of their corresponding data streams. Routers carrying identical or similar content may next be identified.

In an embodiment, the connectivity service provider may use information on data streams with identical or similar content to more efficiently utilize its communication resources.

Figure 1:
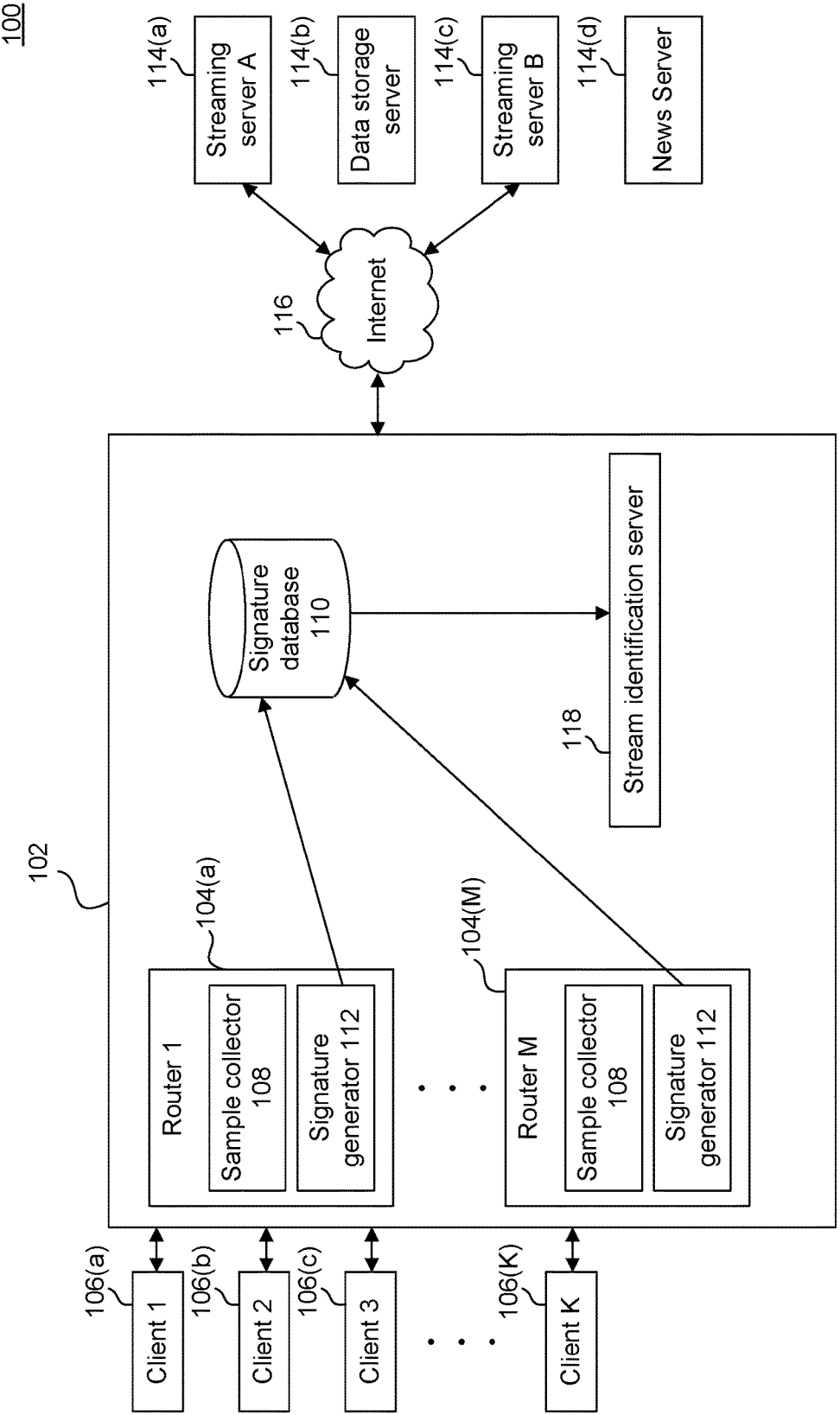
FIG. 1 is a diagram of a connectivity service provider including components for sampling data streams, providing stream signatures, and identifying streams with similar content, according to an embodiment.

FIG. 1 is a diagram of a data transmission environment 100 that includes a connectivity service provider 102. Connectivity service provider 102 includes a plurality of routers 104(a) to 104(M) that provide network connectivity to the Internet 116 for the plurality of clients 106(a) to 106(K).

Clients 106(a) to 106(K) may be end users in a residential environment, and accessing the Internet through their devices such as personal computer (PC), laptop, tablet, smart phone, etc. Alternatively, clients may be commercial such as a business. For example, a business may require connectivity to a data storage server to back-up all the files within its system.

Clients 106(a) to 106(K) may use connectivity service provider 102 to receive data from a variety of content providers, such as streaming servers 114(a) and 114(c), data storage server 114(b), news server 114(d), and/or other servers such as a cloud server. Clients 106(a) to 106(K) may use connectivity service provider 102 to also send (upload) data to a variety of servers.

Clients 106(a) to 106(K) may, for example, reside in a local area network (LAN) confined to a particular area, such as a building. In another example, clients 106(a) to 106(K) may be in a company intranet connecting different computers in the same organization. The various computers may have web browsers or other applications that require access to resources via a network, such as a private network or the Internet. Connectivity service provider environment 102 may use TCP/IP routing protocols, and clients 106(a) to 106(K) may use a publicly or privately addressable IP addresses.

To determine how to route data, the various routers 104(a) to 104(M) on connectivity service provider environment 102 can exchange messages advertising their connectivity. The messages may for example be BGP messages. In that example, the routers that exchange messages may be BGP peers. Using these messages, the various routers can develop routing tables that define how to route data through the network.

Not only do various routers 104(a) to 104(M) on connectivity service provider environment 102 exchange messages, these routers also exchanges messages with at least one router on Internet 116. The routers on the Internet 116 may comprise backbone routers, etc. that provide communication between clients 106(a) to 106(K) of connectivity service provider environment 102 and various servers 114(a) to 114(d) using cable, fiber optics, and/or wireless communication.

Connectivity service provider 102 includes components for sampling data streams, providing stream signatures, and identifying streams with similar content, as will be described next, according to embodiments.

Each router 104(a) to 104(M) has access to a sample collector 108 that periodically samples data packets being relayed through the router. For example, sample collector 108 may receive a sample packet from router 104(a) every 10 seconds. Other sampling periods may alternatively be used. All the samples received from each of routers 104(a) to 104(M) that correspond to a predetermined time period, e.g., 5 minutes, are stored in a buffer. For example, router 104(a) may have stored on its internal memory a first buffer that includes all sample packets (sampled e.g., every 5 or 10 seconds) received from router 104(a) between 5:00 PM and 5:05 PM on a particular day. Additionally, router 104(a) may have stored on its internal memory a second buffer that includes all sample packets (sampled e.g., every 5 or 10 seconds) received from router 104(a) between 5:10 PM and 5:15 PM on the same day. Router 104(b) may also have stored on its internal memory a third buffer that includes all sample packets received from router 104(b) between 5:00 PM and 5:05 PM on the same day, and so on.

In an embodiment, for each router 104(a) to 104(M), sample collector 108 only receives sample packets corresponding to the N (e.g., 1, 2, 3 or higher) heaviest data streams passing through the router. The heaviest data streams may be those requiring the greatest amount of bandwidth. In the above example, the first buffer may only include sample packets received from router 104(a) between 5:00 PM and 5:05 PM on a particular day that correspond to the 3 data streams having the highest rate of data transmission.

In an embodiment, a determination as to which data streams should be sampled by sample collector 108 is made by each of the routers 104(a) to 104(M). In an example according to this embodiment, each router 104(a) to 104(M) has a user interface (graphical or command line). In this example, a user (such as an administrator) in the connectivity service provider environment 102 configures the number of data streams that are to be sampled by sample collector 108. Additionally or alternatively, the user may determine the characteristics of the data streams that are to be sampled (e.g., those streams belonging to a certain protocol, a certain service level agreement, etc.). Additionally or alternatively, the user may determine the sampling period (e.g., every 5 seconds), and the predetermined time period for which the collected sample packets will be stored under one buffer (e.g., for a duration of 5 minutes).

In an embodiment, sample collector 108 may be a daemon operating on each router 104(*a*) to 104(*b*), and periodically collecting packets. Alternatively, sample collector 108 may be a server separate from routers 104(*a*) to 104(M).

Signature generator 112 receives sample packets collected by sample collector 108, optionally filters the sample packets, generates stream signatures based on the sample packets those not filtered out and collected during a predetermined time interval (e.g., between 5:00 PM to 5:05 PM), and stores the generated signatures in signature database 110. We now describe these operations in detail.

Signature generator 112 generates a stream signature based on a series of sample packets received in chronological order that are all associated with a data stream passing through a router, such as router 104(*a*), and correspond to a predetermined time interval. The stream signature is generated based on the header information in the sample packets, as well as the payload of the sample packets. The data within the payload may or may not be encrypted. In generating a stream signature, the payload of a sample packet is considered simply as a binary string, i.e., no parsing is performed on the payload.

In an embodiment, the stream signature may be generated using a hash function applied to the payload and header content of the sample packets.

In an embodiment, the stream signature may be a binary string, and be multiple bytes in length.

In an embodiment, the stream signature may be generated by applying minhash to the payload and/or header content of the sample packets. Minhash is a technique for quickly estimating how similar two sets are. Minhash estimates a Jaccard similarity coefficient of two sets (the ratio of the cardinality of the intersection of two sets to the union of the two sets). Minhash may be used for eliminating near-duplicates among different types of data such as web-pages, images, etc. In this embodiment, minhash may be applied to (header and/or payload information of) the sample packets received from a data stream within a predetermined amount of time, and discard those sample packets that contain near-identical content (header and/or payload). A signature may then be generated for the data stream for the predetermined period of time after eliminating such redundant sample packets.

In an embodiment, once a stream signature is generated, time stamp information is attached to the stream signature to identify to which time interval the stream signature corresponds.

In an embodiment, once a stream signature is generated, router identification information is attached to the stream signature to identify at which router the data stream was observed.

In an embodiment, various statistical information about the stream may be used to generate the stream signature. These statistical information may, for example, include mean data rate, variance of data rate, skewness of data rate, minimum and/or maximum instantaneous data rate, kurtosis of the data rate, and scale of the data rate.

Alternatively, the above statistical information may be attached to the stream signature to specify the characteristics of the data stream to which the stream signature corresponds.

Signature generator 112 may optionally filter sample packets. In an embodiment, signature generator 112 may discard packets that contain information similar to those previously received from other sample packets. In an example according to this embodiment, the filtering is performed using minhash as described above. In an example according to this embodiment, a stream signature is generated by incrementally considering more (chronologically ordered) sample packets. Therefore, if the stream signature based on the first n samples within the predetermined time interval does not change (or substantially change) after considering sample n+1, sample n+1 is discarded.

Signature generator 112 corresponding to each router 104(*a*) to 104(M) stores the generated signatures of the router in signature database 110.

Stream identification server 118 retrieves the stored stream signatures, and performs comparison between all signatures to identify matching stream signatures. Matching stream signatures correspond to those streams whose signatures are substantially similar, and also correspond to the same time interval. This will be described further with respect to FIG. 3. Stream identification server 118 may or may not reside within connectivity service provider environment 102.

Figure 2:
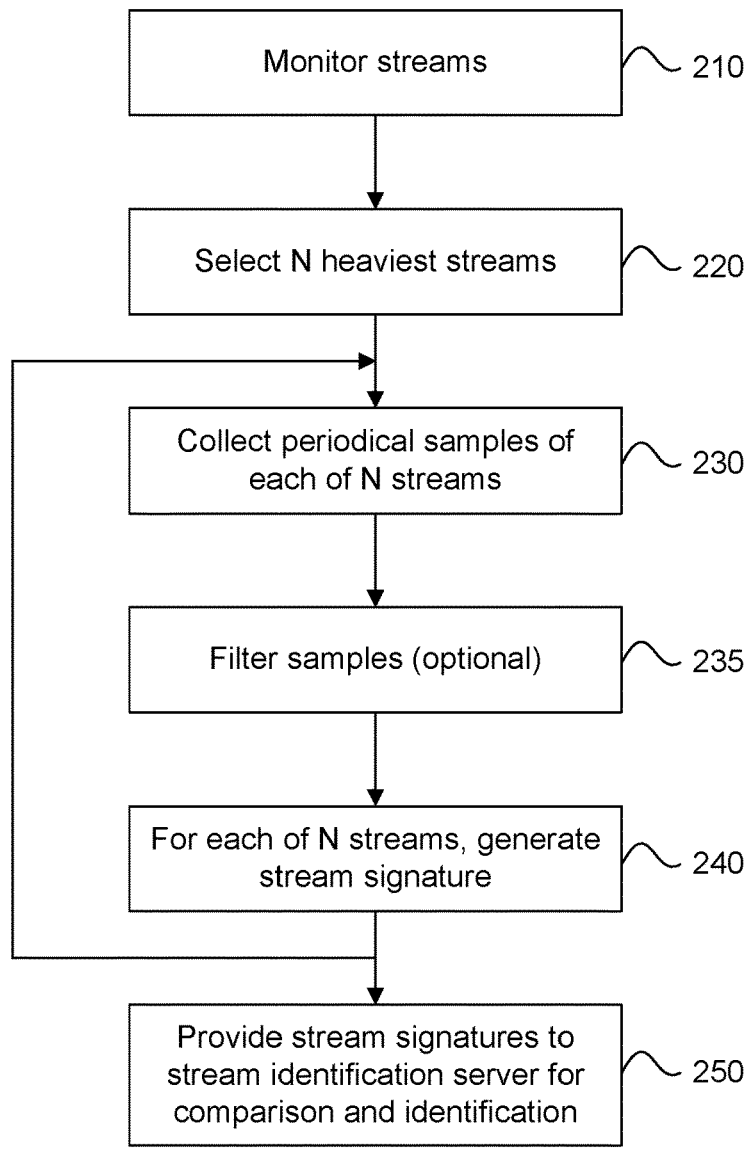
FIG. 2 is a flowchart for a method of monitoring data steams at a router, and providing stream signatures, according to an embodiment.

FIG. 2 is a flowchart for a method of monitoring data steams at a router, and providing stream signatures, according to an embodiment.

At step 210, all streams passing through a router, such as router 104(*a*), are monitored, and their characteristics such as data rate, protocol, etc. are identified. Based on this information, at step 220, a predetermined number ("N") of most bandwidth-intensive (heaviest) data streams are selected for further monitoring. At step 230, periodical samples of each of the N heaviest data streams are collected. Sample collection is performed by a sample collector such as sample collector 108.

The period of packet sampling may vary based on the characteristics and/or the configuration of the components of connectivity service provider environment 102, and/or the characteristics of the data streams. For example, the sampling period may be determined to be 5, 10 or 15 seconds.

At step 235, sample packets are filtered. Filtering may be performed at a signature generator, such as signature generator 112. As a result of this filtering, some sample packets may be discarded.

At step 240, a stream signature is generated for each of the N selected data streams. As described above with respect to signature generator 112 in FIG. 1, for each data stream, the stream signature may be generated based on payload and/or header content of the sample packets collected for that data stream.

In embodiments, additional information may be used in generating the stream signature. Such additional information may, for example, be statistical information about the data rate of the data stream, the source and destination address information of the received sample packets, or information on a total amount of data relayed within the pre-determined period of time may also be used to generate the stream signature.

As previously described with respect to FIG. 1, packets that contain information similar to those previously received from other sample packets may be discarded. In an example according to this embodiment, a stream signature is generated by incrementally considering more (chronologically ordered) sample packets. Therefore, if the stream signature based on the first n samples within the predetermined time interval does not change (or substantially change) after considering sample n+1, sample n+1 is discarded.

Since as described above sample packet filtering may be performed iteratively with stream signature generation considering the most recent generated signature, in FIG. 2, a loop is shown between steps 230, 235, and 240.

In an embodiment, the stream signature may be generated using a hash function applied to the payload and/or header content of the sample packets. The stream signature may be a binary string, and be multiple bytes in length.

In an embodiment, once a stream signature is generated, additional information may be attached to the stream signature. Such additional information may, for example, be time stamp information to identify to which time interval the stream signature corresponds, router identification information to identify at which router the stream was observed, or information about the received packets. The information about the received packets may, for example, comprise packet size information such as Maximum Transmission Unit (MTU) of the packets, packet protocol information (e.g., TCP, UDP, HTTP, STP, RTCP, etc.), or a flag in packet header (e.g., flags indicating packet priority, Class of Service (Cos)), and/or stream identification information such as virtual local access network identifier (VLAN ID). Alternatively, the above information may be used to generate a stream signature.

At step 250, the generated stream signatures for the selected streams are provided to a stream identification server, such as stream identification server 118. As will be described shortly with respect to method 300 in FIG. 3, the stream identification server compares different stream signatures and identifies those streams that are substantially similar.

Figure 3:
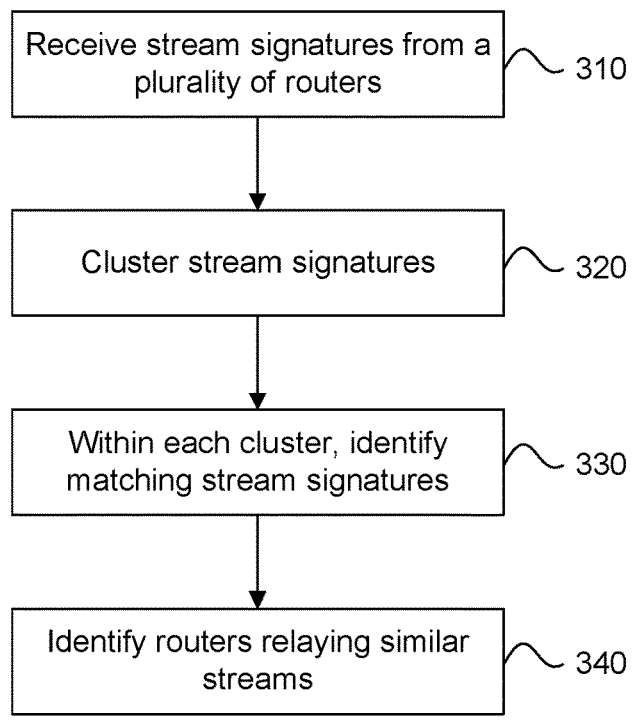
FIG. 3 is a flowchart for a method for identifying streams with similar content, according to an embodiment.

FIG. 3 is flowchart for a method for identifying streams with similar content, according to an embodiment. In an embodiment, this method is performed by a stream identification server such as stream identification server 118.

At step 310, a plurality of stream signatures is received from a plurality of routers. Specifically, the stream signatures may be received from signature generator(s) such as signature generator 112 within each router 104(*a*) to 104 (M).

At step 320, the received stream signatures are classified where members of each class are substantially similar stream signatures. Since the number of these classes in not known beforehand, an unsupervised classification method may be used. For example, clustering (e.g., k-means, hierarchical, mixture models), or unsupervised decision trees may be utilized to classify the stream signatures.

At step 330, each class is further investigated to identify stream signatures that also have similar time stamp information, i.e., correspond to substantially similar time intervals. Note that two matching stream signatures corresponding to two streams with identical content may not have identical time stamps, due to the sampling process not being synchronized across all routers in the connectivity service provider environment. For example, router 104(*a*) and router 104(*b*) may have internal clocks with 1 second time difference. Therefore, a stream passing through router 104(*a*) during a time interval between 5:00:00 PM and 5:10:00 PM of a certain day may correspond to an identical (in content) stream passing through router 104(*b*) during a time interval between 5:00:01 and 5:10:01. Therefore, in an embodiment, in matching stream signatures in one class, two streams with substantially the same time stamps (instead of identical time stamps) are considered matching.

Further checks may be performed on matching signatures with substantially similar time stamps. For example, in an embodiment, statistical information on the data rate of the corresponding streams is attached to the stream signatures. This would allow the stream identification server to determine if two streams are sufficiently similar. For example, if signature A and signature B are clustered in one cluster (class), and they also have substantially the same time stamp, but the average data rate of the data stream corresponding to signature A is 10 times less than the average data rate of the data stream corresponding to signature B, signatures A and B are not considered to be a match in the stream identification server.

In another embodiment, statistical information on the data rate of the corresponding streams is used to generate stream signatures. Therefore, two signatures in the same cluster would necessarily have substantially similar data rate statistics as well.

At step 340, once matching signatures (with similar time stamp, and other desired information) are identified, the routers relaying the streams based on which the matching signatures were generated are also identified. The router information may be attached to each stream signature.

Figure 4:
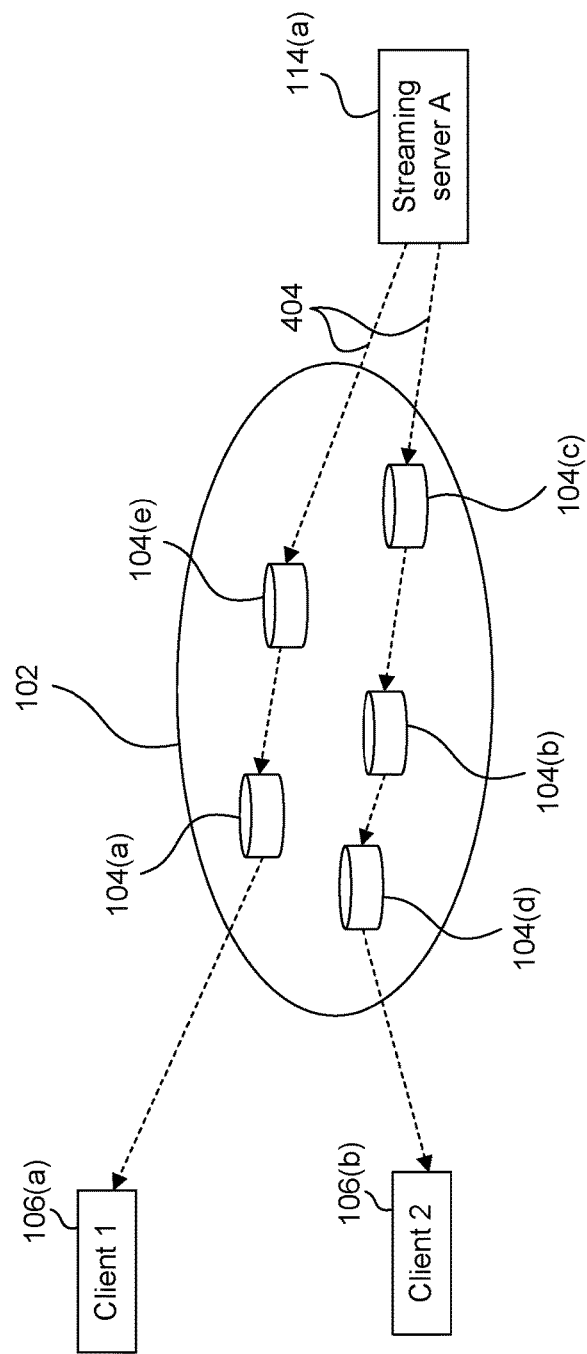
FIG. 4 is a diagram showing an example stream being relayed through at least two paths in a set of routers in a connectivity service provider, according to an embodiment.

In an embodiment, based on this information, the connectivity service provider may determine a map of similar data streams traveling through its routers, and specific paths of these data streams through the routers. An example of two identical data streams simultaneously being relayed through a connectivity service provider environment is shown in FIG. 4. We will describe FIG. 4 shortly.

In an embodiment, once the connectivity service provider environment identifies that the same stream is being relayed through its routers in two separate paths, it reroutes the stream to more efficiently use network resources (e.g., to avoid duplicate transmissions requiring unnecessarily allocated network resources).

In an embodiment, once the connectivity service provider environment identifies that the same stream is being relayed through its routers in multiple separate paths, it identifies or suspects a network security attack. The connectivity service provider environment may consequently take remedial actions to address the attack. For example, the connectivity service provider environment may configure firewalls on its routers to block this data stream, and/or the server from which the suspicious data streams originate. Additionally or alternatively, the connectivity service provider environment may send alerts to clients (e.g., clients 106(*a*) to 106(*c*)) informing them of a security attack. Additionally or alternatively, the connectivity service provider environment may log the suspicious data streams for future investigation. Additionally or alternatively, the connectivity service provider environment may flag all the data streams originating from the same server as that of the suspicious data streams.

FIG. 4 is a diagram showing an example stream being relayed through at least two paths in a set of routers in a connectivity service provider, according to an embodiment. Specifically, stream 404 is simultaneously relayed from streaming server 114(*a*) to client 106(*a*) and 106(*b*). As can be seen in FIG. 4, in a first path to client 106(*a*), the data stream passes through routers 104(*e*) and 104(*a*). In a second path to client 106(*b*), the same data stream passes through routers 104(*c*), 104(*b*) and 104(*d*).

In an example embodiment according to the example scenario shown in FIG. 4, connectivity service provider environment 102 may decide to consolidate the two paths by relaying the data stream 404 to pass only through routers 104(c), 104(b) and 104(d), and be delivered to clients 106(a) and 106(b) from router 104(d) using unicast transmissions.

In another example according to the example scenario shown in FIG. 4, connectivity service provider environment 102 consolidates the two paths by relaying the data stream 404 to pass only through routers 104(c), 104(b) and 104(d), and be delivered to clients 106(a) and 106(b) from router 104(d) by multicasting.

Figure 5:
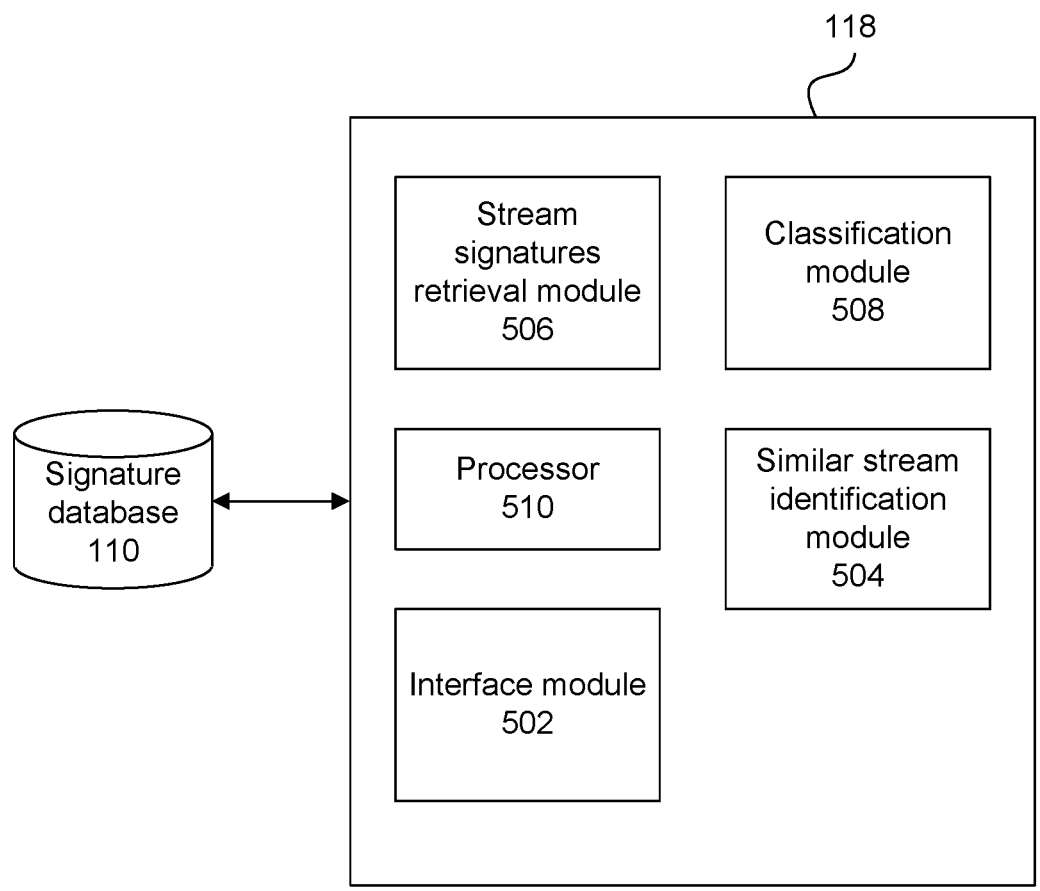
FIG. 5 is a diagram depicting a stream identification server shown in FIG. 1 in further detail, according to an embodiment.

FIG. 5 is a diagram of a stream identification server shown in FIG. 1 in further details, according to an embodiment.

Stream identification server 118 comprises a stream signatures retrieval module 506, a classification module 508, an similar stream identification module 504, one or more processors 510, and may optionally comprise an interface module 502. Each of these components are described below in turn.

Stream signatures retrieval module 506 retrieves a plurality of stream signatures from a signature database such as signature database 110. Communication between signature database 110 and stream signatures retrieval module 506 may be through wired or wireless communication techniques such as cable, a shared bus, WiFi, or Bluetooth.

Classification module 508 classifies the retrieved stream signatures into a plurality of classes. This module implements operations previously described with respect to step 320 in FIG. 3. In an embodiment, classification module 508 performs clustering (e.g., k-means clustering) on the retrieved stream signatures and identifies a plurality of clusters of signatures.

Similar stream identification module 504 examines each identified cluster, and within each cluster determines matching stream signatures that have substantially similar time stamp information. Similar stream identification 504 may use statistical information about the streams (e.g., average, variance, skewness, minimum and/or maximum of data rate within a predetermined interval identified in the time stamp information for each data stream) to further refine the determination of matching stream signatures. Additionally, similar stream identification module 504 identifies routers relaying identified similar streams. Similar stream identification module 504 implements operations described previously with respect to steps 330 and 340 of FIG. 3.

Stream identification server 118 may optionally comprise a user interface module 502 that receives configuration information from a user of the connectivity service provider environment (e.g., an administrator of the connectivity service provider or a client). The configuration information may include one or more criteria and/or information in performing similar stream identification. For example, the configuration information may determine that information on average and variance of a stream's data rate, and protocol information included in stream signatures may be used in identifying matching signatures. Additionally or alternatively, the configuration information may specify that k-means clustering should be used for classification, and so on.

One or more processors 510 may be used to implement, coordinate, and/or configure the component modules within stream identification server 118. The modules may be implemented using hardware, software or a combination thereof.

The term "user," as used herein, may encompass both a customer of the network connectivity service, such as an employee of a business that utilizes the network connectivity service, and a network administrator of the service provider itself. Users may also be at different companies or organizations.

The tables disclosed herein may be any stored type of structured memory, including a persistent memory. In examples, each database may be implemented as a relational database or file system.

Each of the devices and modules in FIGS. 1 and 5 may be implemented in hardware, software, firmware, or any combination thereof.

Each of the devices and modules in FIGS. 1 and 5 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
   at least one processor; and
   memory storing instructions that, when executed by the at least one processor, causes the system to perform a set of operations, the set of operations comprising:

monitoring a plurality of data streams relayed through a plurality of routers in a connectivity service provider environment;

sampling packets of a first data stream received at a first router of the plurality of routers;

filtering the sampled packets to exclude at least one packet based on a determination that the at least one packet does not change a stream signature for the first data stream;

generating the stream signature based at least on the filtered packets, the stream signature comprising an identification of the first router at which the sampled packets were received;

determining, based at least in part on the stream signature and the identification of the router, that the first data stream is identical to a second data stream relayed through a second router different than the first router; and rerouting, based on the determining, at least the first data stream within the connectivity service provider environment, wherein the stream signature is generated without parsing a payload of the filtered packets, and wherein the first data stream is sampled according to a predetermined time interval, and wherein the first data stream is sampled for a predetermined time period.

2. The system of claim 1, wherein the stream signature is generated further based at least on a source address and a destination address of at least one packet of the filtered packets.

3. The system of claim 1, wherein the stream signature is generated further based on statistical information about the first data stream comprising at least one of:
   mean of data rate;
   variance of data rate;
   skewness of data rate;
   minimum data rate; or
   maximum data rate.

4. A method for identifying similar data streams in a connectivity service provider environment, the method comprising:
   monitoring a plurality of data streams relayed through a plurality of routers in a connectivity service provider environment;
   sampling packets of a first data stream received at a first router of the plurality of routers;
   filtering the sampled packets to exclude at least one packet based on a determination that the at least one packet does not change a stream signature for the first data stream;
   generating the stream signature based at least on the filtered packets, the stream signature comprising an identification of the first router at which the sampled packets were received;
   determining, based at least in part on the stream signature and the identification of the router, that the first data stream is identical to a second data stream relayed through a second router different than the first router; and
   rerouting, based on the determining, at least the first data stream within the connectivity service provider environment,
   wherein the stream signature is generated without parsing a payload of the filtered packets, and
   wherein the first data stream is sampled according to a predetermined time interval, and wherein the first data stream is sampled for a predetermined time period.

5. The method of claim 4, wherein the stream signature is generated further based at least on a source address and a destination address of at least one packet of the filtered packets.

6. The method of claim 4, wherein the stream signature is generated without parsing a payload of the filtered packets.

7. The method of claim 4, wherein the stream signature is generated further based on statistical information about the first data stream comprising at least one of:
   mean of data rate;
   variance of data rate;
   skewness of data rate;
   minimum data rate; or
   maximum data rate.

8. The method of claim 4, wherein the first data stream is sampled according to a predetermined time interval, and wherein the first data stream is sampled for a predetermined time period.

* * * * *